(12) United States Patent
Weston

(10) Patent No.: US 8,640,535 B2
(45) Date of Patent: Feb. 4, 2014

(54) APPARATUS AND METHOD FOR TIRE TEMPERATURE MEASUREMENT

(75) Inventor: David Alan Weston, Hendersonville, NC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 114 days.

(21) Appl. No.: 13/497,633

(22) PCT Filed: Sep. 30, 2009

(86) PCT No.: PCT/US2009/059008
§ 371 (c)(1),
(2), (4) Date: Mar. 22, 2012

(87) PCT Pub. No.: WO2011/040913
PCT Pub. Date: Apr. 7, 2011

(65) Prior Publication Data
US 2012/0300809 A1 Nov. 29, 2012

(51) Int. Cl.
*G01M 17/02* (2006.01)
*B60C 23/00* (2006.01)

(52) U.S. Cl.
USPC ............ 73/146; 73/146.5; 340/442; 340/447

(58) Field of Classification Search
None
See application file for complete search history.

(56) References Cited

U.S. PATENT DOCUMENTS

| | | | |
|---|---|---|---|
| 3,898,615 A | 8/1975 | Hosaka | |
| 4,052,696 A | 10/1977 | Enabnit | |
| 5,452,608 A | 9/1995 | Green | |
| 6,025,777 A | 2/2000 | Fuller et al. | |
| 6,255,940 B1* | 7/2001 | Phelan et al. | 340/447 |
| 6,624,748 B1* | 9/2003 | Phelan et al. | 340/442 |
| 6,630,885 B2 | 10/2003 | Hardman et al. | |
| 6,829,925 B2* | 12/2004 | Nespo et al. | 73/146 |
| 7,047,800 B2 | 5/2006 | Theisen et al. | |
| 2003/0209063 A1 | 11/2003 | Adamson et al. | |

(Continued)

FOREIGN PATENT DOCUMENTS

| EP | 0 937 615 A2 | 8/1999 |
|---|---|---|
| EP | 1 598 220 A2 | 11/2005 |

(Continued)

OTHER PUBLICATIONS

PCT International Search Report for PCT/US09/059008, dated Nov. 24, 2009.

(Continued)

*Primary Examiner* — Andre Allen
(74) *Attorney, Agent, or Firm* — Dority & Manning, P.A.

(57) ABSTRACT

Apparatus and method for tire temperature measurement is disclosed. The apparatus includes a thermocouple having a measurement junction and a pair of first and second conductive leads. The measurement junction is mounted in a passage provided in the tire. The pair of first and second conductive leads extend through the passage in the tire and exit the tire at an interface. A patch is mounted to the tire at the interface. The pair of first and second conductive leads extend from the interface into a passage provided in the patch. The first and second conductive leads are surrounded by the patch at the interface where the first and second conductive leads exit the surface of the tire.

20 Claims, 3 Drawing Sheets

(56) References Cited

U.S. PATENT DOCUMENTS

| | | | |
|---|---|---|---|
| 2004/0118196 A1* | 6/2004 | Landes et al. | 73/146 |
| 2006/0136166 A1 | 6/2006 | Luchini et al. | |
| 2008/0289407 A1* | 11/2008 | Gramling et al. | 73/146.5 |
| 2013/0081457 A1* | 4/2013 | Wilson et al. | 73/146 |

FOREIGN PATENT DOCUMENTS

| | | |
|---|---|---|
| EP | 1 501 691 B1 | 11/2006 |
| JP | 06-129952 | 5/1994 |
| JP | 2003-211926 A | 7/2003 |
| JP | 2003-306015 | 10/2003 |
| KR | 392017 | 12/2002 |
| WO | WO 01/74609 A1 | 10/2001 |
| WO | WO 02/07993 A2 | 1/2002 |
| WO | WO 03/095245 A1 | 11/2003 |
| WO | WO 2006/085191 A1 | 8/2006 |

OTHER PUBLICATIONS

European Search Report for EP 09 85 0141, dated Mar. 6, 2013.

* cited by examiner

APPARATUS AND METHOD FOR TIRE TEMPERATURE MEASUREMENT

FIELD OF THE INVENTION

The present subject matter relates to an apparatus and method for tire temperature measurement. In particular, the present subject matter relates to an apparatus and method for tire temperature measurement using a thermocouple embedded or provided in a tire.

BACKGROUND OF THE INVENTION

Temperature measurement of a tire during use on vehicles is difficult. A common method for temperature tire measurement is insertion of a thermocouple into the tire. A thermocouple typically includes a junction of two conductive leads formed from dissimilar metals. The voltage produced by the junction of the two conductive leads is directly proportional to the temperature at the junction according to the well known Seebeck effect. The temperature of the tire at the measurement junction can be determined by measuring the voltage produced by the junction, so long as a reference junction temperature is also known. The depth and angle of insertion of the thermocouple can be controlled so as to place the junction of the thermocouple at the point of interest for temperature measurement.

Figure 1:
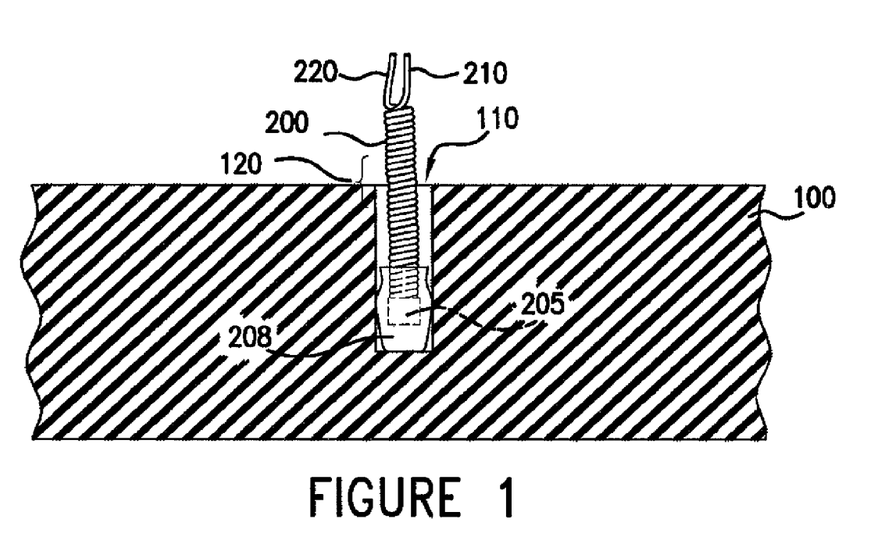
FIG. 1 provides a cross-sectional view of an exemplary thermocouple measurement junction located in a passage provided in a tire.

FIG. 1 illustrates a typical thermocouple 200 embedded into a passage 110 provided in tire structure 100. As illustrated, the rubber material of tire structure 100 surrounds and holds thermocouple 200. Thermocouple 200 includes a measurement junction 205 of dissimilar conductors surrounded by a protective casing 208. Dissimilar conductors 210 and 220 extend out from measurement junction 205 as conductive leads 210 and 220. By commonly known methods, measurement junction 205 has been inserted at a desired depth and angle so as to be located at a point of interest for measurement. Conductors 210 and 220 extend through passage 110 and exit the rubber material of tire 100 at interface 120.

A disadvantage of using thermocouples in the manner discussed above is the significant cyclic stress that can be applied to the thermocouple conductive leads during rotation of the tire. This cyclic stress can be particularly strong when concentrated at the interface where the conductive leads exit the surface of the tire. The stresses applied to the conductive leads can rapidly fatigue the conductive leads, resulting in distorted temperature measurements and eventual failure of the thermocouple.

Thus, there is a need for a tire temperature measurement apparatus and method that overcomes the above disadvantages. While various implementations of tire temperature measurement techniques using thermocouples have been implemented, no design has emerged that generally encompasses all of the desired characteristics as hereafter presented in accordance with the subject technology.

SUMMARY OF THE INVENTION

Aspects and advantages of the invention will be set forth in part in the following description, or may be obvious from the description, or may be learned through practice of the invention.

One exemplary embodiment of the present invention is directed to a tire temperature measurement apparatus. The apparatus includes a thermocouple having a measurement junction and a pair of first and second conductive leads. The measurement junction is mounted in a passage provided in the tire. The pair of first and second conductive leads extends through the passage in the tire and exits the tire at an interface. A patch is mounted to the tire at the interface. The pair of first and second conductive leads extends from the interface into a similar passage provided in the patch. The apparatus further includes a temperature measurement circuit in operable communication with the pair of first and second conductive leads. The first and second conductive leads are surrounded by the patch at the interface where the first and second conductive leads exit the surface of the tire. Thus, the patch material also holds the pair of first and second conductive leads, reducing the cyclic stress concentration that can occur at this interface.

Various additions or modifications can be made to this exemplary embodiment of the invention.

For example, another exemplary embodiment of the present invention is directed to a method for measuring temperature of a tire. The method includes placing a patch on a surface of a tire and providing a passage in the patch and in the tire. The method includes inserting a thermocouple having a measurement junction and a pair of first and second conductive leads into the passage provided in the patch and the tire such that the measurement junction of the thermocouple is mounted in the passage provided in the tire and the first and second conductive leads extend through the passage in the tire and exit the surface of the tire at an interface. The method further includes placing the first and second conductive leads in operable communication with a temperature measurement circuit and measuring the thermocouple measurement junction signal and calculating the temperature of the tire at the measurement junction. The first and second conductive leads are surrounded by the patch at the interface where the first and second conductive leads exit the surface of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Generally, the present subject matter is directed to methods and apparatus for measuring the temperature of a tire. According to exemplary aspects of the present disclosure, a thermocouple having a measurement junction and a pair of first and second conductive leads can be inserted into a tire. The angle and depth of insertion can be controlled to insert the measurement junction of the thermocouple at a point of interest for temperature measurement for the tire. The thermocouple conductive leads extend from the junction through the tire and exit the surface of the tire at an interface.

The apparatus and methods of the present disclosure reduce cyclic stresses applied to the thermocouple conductive leads during rolling of the tire by keeping the leads enclosed in a patch of similar material as the tire material at the interface where the conductive leads exit the surface of the tire. For instance, the conductive leads are enclosed in the patch until the conductive leads are connected to a temperature measurement circuit. As will be discussed in detail below, the conductive leads are connected to a temperature measurement circuit at a necessary reference junction where the conductive leads may join copper or other dissimilar conductive metals.

By enclosing the conductive leads in a patch formed, for instance, from a rubber material, the movement and flexing of the conductive leads during tire rotation can be reduced to the same or lower level as occurs within the material of the tire. Accordingly, enclosing the thermocouple conductive leads in the patch at the interface where the conductive leads exit the surface of the tire protects the conductive leads from damage or other fatigue caused during rotation of the tire at least to a level of fatigue lower than that which occurs while embedded in the material of the tire.

The temperature measurement circuit can be used to convert the voltage produced by the thermocouple junction into a temperature measurement. The temperature measurement circuit can include a processor and a reference junction. The reference junction is the location where the conductive leads of the thermocouple are physically joined to communication leads for communicating thermocouple signals to the processor. As will be discussed in detail below, the conductive materials of the communication leads can be different from the conductive materials of the pair of first and second thermocouple leads, leading to distortions in the signal provided by the thermocouple alone since any junction of dissimilar metals occurring in the circuit will also generate a voltage according to the Seebeck effect. The reference junction can include an independent temperature measurement device such as a p-n junction or a thermistor that is used to generate an error signal to compensate for the distortions caused by the junction of dissimilar metals at the reference junction. The processor can be configured to determine the temperature of the tire at the location of the thermocouple junction by using the signals provided by the communication leads and the error signal provided by the independent temperature measurement device.

In accordance with certain embodiments of the present disclosure, the processor and the reference junction can be located on a circuit board that is mounted to the tire. In other embodiments, the reference junction can be located in the patch and the processor can be located on a circuit board that is mounted to the tire. It may be necessary to independently measure the temperature of the reference junction to compensate for distortions caused by the junction of dissimilar metals at the reference junction. It can also be necessary to take precautions against the formation of temperature gradients across the reference junction where the two conductive leads are joined with communication leads. In certain embodiments, this can be accomplished by keeping the junctions of the two conductive leads with the communications leads thermally close together with each other and with an independent temperature measurement transducer, and through the use of proper insulation material surround the reference junction and the temperature measurement transducer.

The circuit board containing the microprocessor and/or the reference junction can be mounted to the tire using a variety of techniques. For instance, in one embodiment, the circuit board can be mounted directly to the patch that encloses the thermocouple conductive leads and/or the reference junction. In another embodiment, the circuit board can be mounted to the tire using 1-D orthogonal connection line techniques disclosed in PCT Application Serial No. PCT/US2008/074765 and PCT Application Serial No. PCT/US2009/042357, both of which are hereby incorporated by reference for all purposes.

FIG. 1 illustrates a typical thermocouple 200 inserted into passage 110 provided in tire 100. Thermocouple 200 includes a measurement junction 205 of dissimilar conductive metals. For instance, measurement junction 205 can be a junction of chromel and alumel conductors. The conductors extend from measurement junction 205 as conductive leads 210 and 220. Conductive lead 210, for instance, can be the chromel conductive lead. Conductive lead 220, for instance, can be the alumel conductive lead. In accordance with well known principles, i.e. the Seebeck effect, the voltage produced by the junction of the dissimilar conductors is directly proportional to the temperature of the junction. Thus, the temperature of a point of interest on a tire can be determined by measuring the voltage between conductive leads 210 and 220 of thermocouple 200.

Thermocouple junction 205 is surrounded by a protective casing 208 to protect measurement junction 205. Protective casing 208 can be any of a variety of materials, including ceramic materials, plastic materials, rubber materials, or any other suitable materials. Preferably, this protective casing is formed from an electrically insulating material in order to avoid interference from the tire material in case the tire material electrical conductivity is great enough to interfere with the thermocouple signal. Conductive leads 210 and 220 are each provided with an insulator covering. In certain embodiments, conductive leads 210 and 220 can be coiled in a tight pitch around a multi-filament core material as shown in FIG. 1. Coiling the leads 210 and 220 in a tight pitch can provide added stability, strength, and flexing durability to thermocouple 200. This approach is compatible with principles of thermocouple measurement which generally advise to reduce thermocouple wire diameter to avoid possible temperature measurement error due to thermal conduction of the wires themselves.

Thermocouple 200 can be inserted into tire 100 using a variety of different techniques. For instance, in one embodiment, passage 110 can have previously been provided in tire 100 by drilling tire 100 with a small conventional drill. Thermocouple 200 can be inserted into tire 100 by first inserting thermocouple 200 into a rigid tube such that the protective casing 208 of junction 205 abuts the edge of the tube and such that conductive leads 210 and 220 are located inside the hollow portion of the tube. The tube/thermocouple assembly is then inserted into passage 110. The protective casing 208 of junction 205 is retained by frictional engagement with the sides of passage 110. The tube can be withdrawn, leaving thermocouple 200 mounted in tire 100. The angle and depth of insertion of thermocouple 200 into tire 100 can be controlled using a variety of techniques to provide the measurement junction 205 of thermocouple 200 at a point of interest for temperature measurement for the tire.

As illustrated in FIG. 1, conductive leads 210 and 220 of thermocouple 200 extend through passage 110 of tire 100 and exit the surface of tire 100 at interface 120. During rotation of tire 100, significant cyclic stresses are applied to conductive leads 210 and 220. As previously described, these cyclic stresses are particularly concentrated and strong at the interface 120 where the conductive leads exit the surface of the tire 100 into the air. In this case, stresses applied from rotation of the tire can rapidly fatigue conductive leads 210 and 220, resulting in distorted temperature measurements and eventual failure of thermocouple 200.

To overcome these disadvantages, embodiments of the present disclosure maintain conductive leads 210 and 220 of thermocouple 200 enclosed in a patch at interface 120 where conductive leads 210 and 220 exit the surface of tire 100. For instance, with reference now to FIG. 2, thermocouple 200 is mounted in a passage 110 provided in tire 100. The junction and protective casing of thermocouple 200 are retained at the bottom of passage 110 while the conductive leads of thermocouple 200 extend through passage 110 and exit the surface of tire 100 at interface 120.

Figure 2:
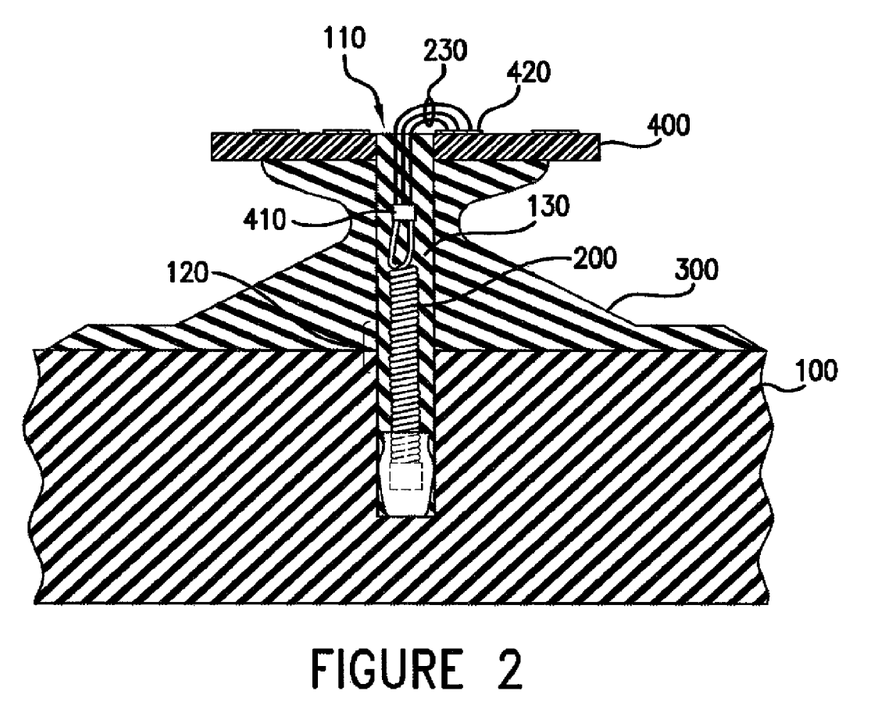
FIG. 2 provides a cross-sectional view of an exemplary apparatus for tire temperature measurement according to one exemplary embodiment of the present disclosure.

As illustrated, a patch 300 is located on the surface of tire 100 at interface 120. Patch 300 can be formed from any of a variety of materials, including rubber materials, elastomeric materials and/or polymeric materials. Preferably, the material of patch 300 is similar to the material of tire 100. Patch 300 depicted in FIG. 2 provides a support surface for circuit board 400. Circuit board 400 can be secured to patch 300 using a Chemlok® adhesive material or other suitable adhesive material. Patch 300 serves to provide support for circuit board 400 and also serves to dampen stresses and other forces applied to circuit board 400 during rotation of tire 100.

At interface 120, where the conductive leads of thermocouple 200 exit the surface of tire 100, the conductive leads of thermocouple 200 are completely surrounded by patch 300. The conductive leads of thermocouple 200 remain enclosed in the patch 300 until they are operably connected to the temperature measurement circuit. In this manner, patch 300 protects the conductive leads from damage or other fatigue during rotation of the tire.

As shown in FIG. 2, temperature measurement circuit includes a reference junction 410 and a processor 420. Processor 420 is used to determine temperature using signals provided from thermocouple 200 and an error signal from reference junction 410. Processor 420 can store temperature measurements in a database or can transmit temperature measurements to an external device via, for instance, RF communication techniques. Processor 420 of FIG. 2 is located on circuit board 400 and can be programmed with various instructions to perform various functions in accordance with aspects of the present technology. For instance, processor 420 can include one or more computing devices that are adapted to provide desired functionality by accessing software instructions rendered in a computer-readable form. When software is used, any suitable programming, scripting, or other type of language or combinations of languages may be used. However, software need not be used exclusively, or at all. For example, some embodiments set forth herein may also be implemented by hard-wired logic or other circuitry, including, but not limited to, application-specific circuits. Of course, combinations of computer-executed software and hard-wired logic or other circuitry may be suitable, as well.

The conductive leads of thermocouple 200 are operably connected to the temperature measurement circuit at reference junction 410. Reference junction 410 is the junction where the conductive leads of thermocouple 200 are physically connected to the temperature measurement circuit. In FIG. 2, reference junction 410 is located within patch 300. Communication leads 230 communicate signals from reference junction 410 to microprocessor 230. Communication leads 230 extend through passage 110 provided in patch 300 until connected to circuit board 400. As will be discussed with respect to FIGS. 4 and 5, reference junction 410 can also be located on circuit board 400 such that thermocouple conductive leads extend all the way through passage 110 in patch 300 until connected to a reference junction located on circuit board 400.

Reference junction 410 will now be discussed in detail with respect to FIG. 3. As discussed above, conductive leads 210 and 220 of thermocouple 200 are formed from dissimilar conductors that are joined together at measurement junction 205. For instance, the conductive leads 210 and 220 of thermocouple 200 can be formed from chromel material and alumel material respectively. The junction of dissimilar metals at thermocouple measurement junction 205 produces a temperature-dependent voltage that is used to determine the temperature of tire 100 at the location of measurement junction 205.

To communicate the appropriate thermocouple signals to processor 420 so that processor 420 can convert the thermocouple signals into temperature measurements, conductive leads 210 and 220 of thermocouple 200 must be physically joined at some location to communication leads 230 of a temperature measurement circuit. The communication leads 230 can be formed from the same conductive materials as thermocouple conductive leads 210 and 220. However, in many instances, the conductive material of the communication leads 230 is different from that of thermocouple leads 210 and 220. For instance, the communication leads 230 can be formed from a copper material, and the thermocouple conductive leads 210 and 220 can be formed from a chromel and alumel material respectively. Similar to thermocouple junction 205, the physical connection between dissimilar metals of thermocouple conductive leads 210 and 220 and the communication leads 230 will produce a temperature-dependent voltage opposed in polarity to the voltage produced at the thermocouple junction.

Figure 3:
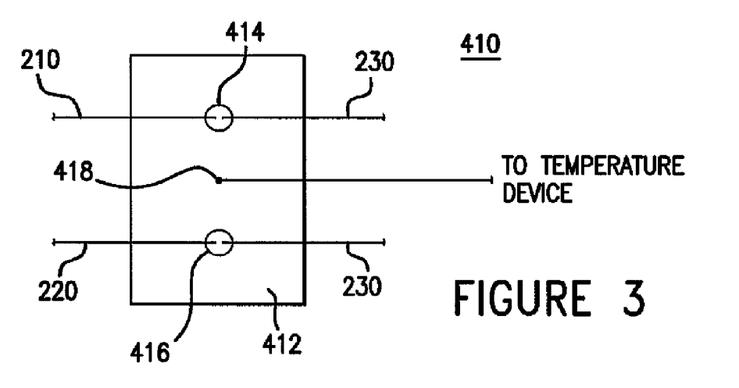
FIG. 3 provides a plan view of an exemplary reference junction that can be used as part of an exemplary temperature measurement circuit according to one exemplary embodiment of the present disclosure.

More particularly, referring now to FIG. 3, conductive lead 210 is physically connected to communication lead 230 at junction 414. Conductive lead 220 is physically connected to communication lead 230 at junction 416. If conductive lead 210 is framed from a different conductive material than communication lead 230, a temperature-dependent voltage opposed in polarity to the thermocouple junction voltage will be generated by junction 414. Similarly, if conductive lead 220 is formed from a different conductive material than communication lead 230, a temperature-dependent voltage opposed in polarity to the thermocouple junction voltage will be generated by junction 416.

To compensate for the distortions to the thermocouple signal created at reference junction 410, a temperature measurement device can be placed in intimate thermal contact with reference junction 410. For instance, junction 414 and junction 416 can be located on a copper or other thermal conductive plate 412. Temperature measurement device can be placed in thermal contact with thermal conductive plate 412 at the center 418 of conductive plate between junctions 414 and 416. The temperature measurement device will produce an error signal based on the temperature of thermal conductive plate 412. The temperature measurement device can be any of a variety of suitable devices for measuring the temperature of reference junction 410, including a p-n junction or a thermistor. The error signal can be communicated to processor 420 through a communication lead 230. Based on signals received from communication leads 230, processor 420 will generate a temperature measurement based on the voltage produced by measurement junction 205.

The apparatus of FIG. 2 can be constructed using techniques similar to those discussed with respect to the insertion of thermocouple 200 into tire 100 of FIG. 1. For example, patch 300 can first be placed on the surface of tire 100. Passage 110 can be provided in tire 100 and patch 300 by drilling the tire 100 and patch 300 a small conventional drill. Printed circuit board 400 can be placed on top of patch 300 prior to drilling the tire 100 and patch 300. The passage 110 provided in circuit board 400 can be used as a guide for drilling passage 110 into patch 300 and tire 100.

As discussed above, thermocouple 200 can be inserted into tire 100 by first inserting thermocouple 200 into a tube such that the protective casing 208 of measurement junction 205 abuts the edge of the tube and such that conductive leads 210 and 220 are located inside the hollow portion of the tube. The tube/thermocouple assembly can then inserted into the passage 110 provided by the stinger apparatus. The protective casing 208 of measurement junction 205 is retained by compression and frictional engagement with the sides of passage 110. The tube can be withdrawn, leaving thermocouple 200 mounted in tire 100. The conductive leads 210 and 220 can then be placed in operable communication with a temperature measurement circuit, for instance, by connecting conductive leads 210 and 220 to the temperature measurement circuit at reference junction 410.

In certain embodiments, passage 110 provided in patch 300 and tire 100 can be filled with a filler material 130. Filler material 130 can be a urethane material, epoxy material, or other suitable material. Filler material 130 provides an added layer of protection for thermocouple 200 and serves to further reduce stresses applied to thermocouple 200 during rotation of tire 100. In a particular embodiment, filler material 130 can have a modulus of elasticity that is similar to the modulus of elasticity of the material of patch 300 or tire 100.

Figure 4:
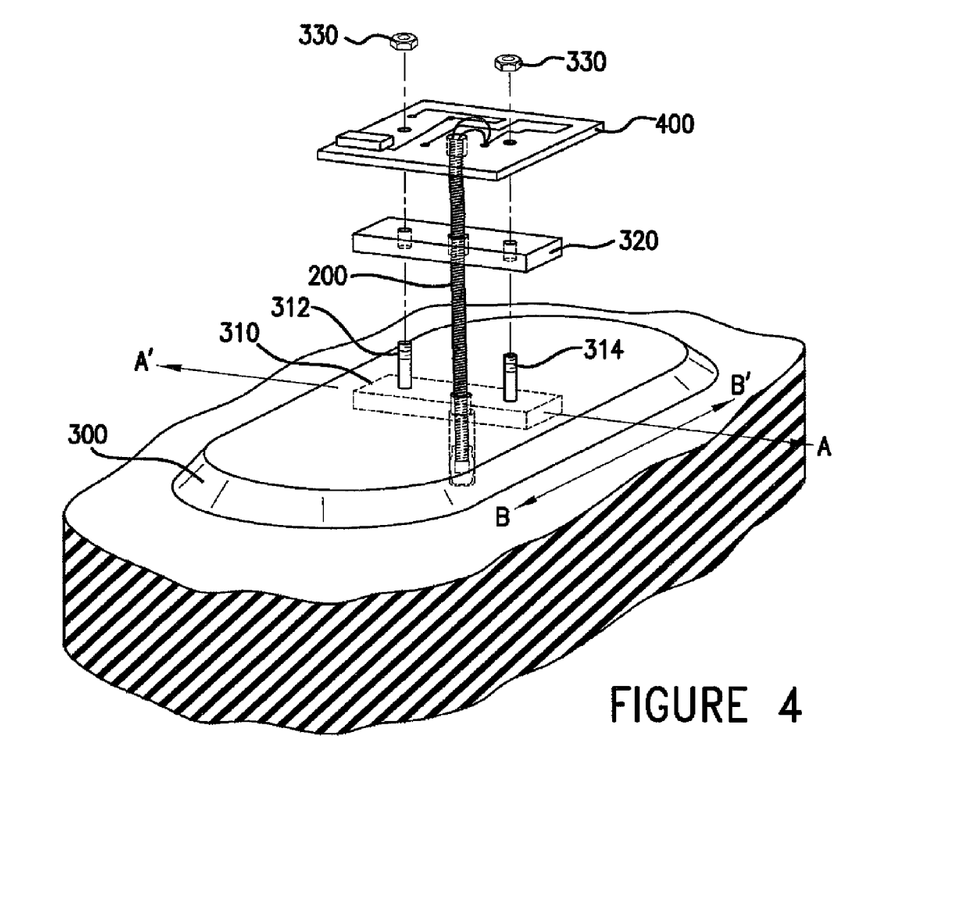
FIG. 4 provides an exploded view of an exemplary apparatus for tire temperature measurement according to one exemplary embodiment of the present disclosure.
Figure 5:
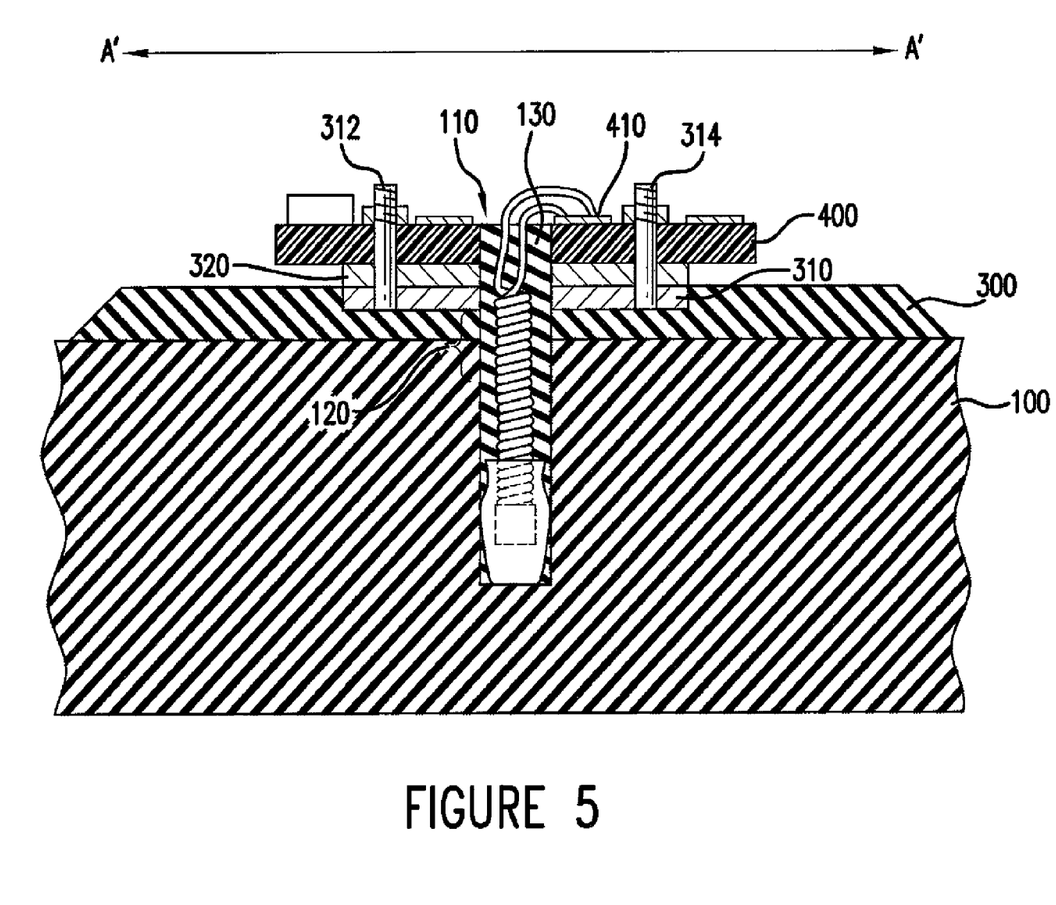
FIG. 5 provides a cross-sectional view of an exemplary apparatus for tire temperature measurement according to one exemplary embodiment of the present disclosure.

FIGS. 4 and 5 depict another exemplary embodiment of the present disclosure. As shown, a patch 300 is located on the surface of tire 100. Patch 300 can be formed from any of a variety of materials, including rubber materials, elastomeric materials and/or polymeric materials. Patch 300 provides mechanical support for circuit board 400. Circuit board 400 can include a temperature measurement circuit for determining temperature measurements from signals provided through conductive leads of thermocouple 200.

Patch 300 includes a first support element 310 embedded within patch 300. First support element 310 can have a degree of rigidity so as to provide mechanical support for circuit board 400. First support element 310 can be composed of any insulating or non-conductive material, such as, for example, FR4. First support element 310 can be bonded to patch 300 through an adhesive such as the Chemlok® adhesive or other suitable adhesive. In another embodiment, first support element 310 can be formed of a hard rubber or other rigid material that is embedded, integral, or a part of patch 300. In this embodiment, no adhesive is necessary to bond first support element 310 to patch 300. First support element 310 can include rounded edges to reduce strain applied to patch 300.

First support element 310 includes a pair of first and second posts 312 and 314 that extend from first support element 310. First and second posts 312 and 214 can be attached to first support element 310 through nuts or sockets embedded in first support element 310. In other embodiments, first and second posts 312 and 314 can be integral with first support element 310. First support element 310 can also include an opening or passage for passage of the thermocouple 200. As shown in FIGS. 4 and 5, the opening or passage for passage of thermocouple 200 can be arranged in a substantially linear relationship between first and second posts 312 and 314.

Located above the top surface of patch 300 is second support element 320. Second support element 320 acts as a spacer between printed circuit board 400 and patch 300. Second support element 320 can have a height sufficient to prevent circuit board 400 from contacting the top surface of tire 400 when subjected to mechanical stresses, such as, for example, during rotation of a tire. Second support element 320, similar to first support element 310, may be formed of an insulating material, such as, for example, FR4. The second support element 320 cooperates with first support element 310 to provide mechanical support for circuit board 400. As illustrated, first and second posts 312 and 314 extend through openings provided in second support element 320 and are connected to circuit board 400. Fasteners 330 can be used to mechanically connect circuit board 400 to first and second posts 312 and 314. Second support element 320 can also include an opening or passage for passage of the thermocouple 200. As shown in FIGS. 4 and 5, the opening or passage for passage of the thermocouple can be arranged in a substantially linear relationship between the openings for receiving first and second posts 312 and 314.

Thermocouple 200 is mounted in a passage 110 provided in tire 100. The measurement junction and protective casing of thermocouple 200 are retained at the bottom of passage 110 while the conductive leads of thermocouple 200 extend through passage 110 and exit the surface of tire 100 at interface 120. The conductive leads of thermocouple 200 extend through passage 110 provided in patch 300 and extend through the openings or passages provided in first support element 310 and second support element 320 until the conductive leads of thermocouple reach circuit board 400. The conductive leads 220 are connected to a reference junction 410 that is located on circuit board 400. Reference junction 410 can be similar to the reference junction discussed above with respect to FIG. 3.

At interface 120, the conductive leads of thermocouple 200 are completely surrounded by patch 300. The conductive leads of thermocouple 200 remain completely surrounded by patch 300 until the conductive leads pass through the opening in first support element 310 and second support element 320. By enclosing the conductive leads in patch 300, first support element 310, and second support element 320, the movement and flexing of the conductive leads during tire rotation can be reduced.

To further reduce stresses applied to thermocouple 200 during rotation of tire 100, circuit board 400 and patch 300 can be mounted to tire 100 using 1-D orthogonal connection line techniques disclosed in PCT Application Serial No. PCT/US2008/074765 and PCT Application Serial No. PCT/US2009/042357, both of which are hereby incorporated by reference for all purposes.

For instance, patch 300 can have a longitudinal direction represented by line B-B' in FIG. 4. Patch 300 can be mounted to tire such that the longitudinal direction of patch 300 is substantially perpendicular to the direction of rotation of tire 100, which is represented in FIG. 4 and FIG. 5 as line A-A'. First and second posts 312 and 314 in addition to passage provided in first support element 310 and second support element 320 can be arranged in a substantially linear relationship along a line about 80° to about 100° to the longitudinal direction of patch 300.

When patch 300 is positioned such that the longitudinal direction of patch 300 is substantially perpendicular to the direction of rotation of tire 100, a primary bending direction is established in the longitudinal direction of patch 300. The mounting of thermocouple 200, patch 300, and circuit board 400 such that first and second support posts 312 and 314 and thermocouple 200 are in a substantially linear relationship along a line about 80° to about 100° to the longitudinal direction of patch 300 limits strain at and between connections between thermocouple 200, patch 300, and circuit board 400 due to their substantially perpendicular alignment to the primary strain direction, i.e. the longitudinal direction of patch 300.

The apparatus of FIGS. 4 and 5 can be constructed using techniques similar to those discussed with respect to the insertion of thermocouple 200 into tire 100 of FIGS. 1 and 2. For example, patch 300 can first be placed on the surface of tire 100. First support element 310 having first and second posts 312 and 314 are embedded in patch 300. Second support element 320 can be position above patch 300 such that first and second posts 312 and 314 extend through second support element 320. Circuit board 400 can be operably connected to first and second posts 312 and 314 extending from first support element 310 and through second support element 320. As illustrated in FIGS. 4 and 5, a passage 110 is provided in first support element 310, second support element 320, and circuit board 400.

Passage 110 can be extended into patch 300 and tire 100 by drilling patch 300 and tire 100. The passage 110 provided in first support element 310, second support element 320, and circuit board 400 can be used as a guide for drilling passage 110 into patch 300 and tire 100.

As discussed above, thermocouple 200 can be inserted into tire 100 by first inserting thermocouple 200 into a rigid tube such that the protective casing 208 of measurement junction 205 abuts the edge of the tube and such that conductive leads 210 and 220 are located inside the hollow portion of the tube. The tube/thermocouple assembly can then inserted into the passage 110. The protective casing 208 of measurement junction 205 is retained by compression and frictional engagement with the sides of passage 110. The tube can be withdrawn, leaving thermocouple 200 mounted in tire 100. The conductive leads 210 and 220 can then be placed in operable communication with a temperature measurement circuit, for instance, by connecting conductive leads 210 and 220 to the temperature measurement circuit at reference junction 410.

In certain embodiments, passage 110 provided in circuit board 400, first support element 310, second support element 320, patch 300 and tire 100 can be filled with a filler material 130. Filler material 130 can be a urethane material, epoxy material, or other suitable material. Filler material 130 provides an added layer of protection for thermocouple 200 and serves to further reduces stresses applied to thermocouple 200 during rotation of tire 100. In a particular embodiment, filler material 130 can have a modulus of elasticity that is similar to the modulus of elasticity of the material of first support element 310 and second support element 320.

Although the discussion of the present subject matter has been made with reference to a single thermocouple mounted in a tire, those of ordinary skill in the art, using the disclosures provided herein, should readily understand that a plurality of thermocouples can be used without deviating from the scope of the present invention. Such plurality of thermocouples can be connected to a single reference junction or to a plurality of different reference junctions and/or temperature measurement circuits as desired.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire temperature measurement apparatus, comprising:
a thermocouple having a measurement junction and a pair of first and second conductive leads, said measurement junction being mounted in a first passage provided in the tire, said pair of first and second conductive leads extending through the first passage in the tire and exiting the surface of the tire at an interface;
a patch mounted to the tire at said interface, said pair of first and second conductive leads extending from said interface into a second passage provided in said patch; and
a temperature measurement circuit in operable communication with said pair of first and second conductive leads;
wherein said first and second conductive leads are surrounded by said patch at said interface where said first and second conductive leads exit the tire.

2. The tire temperature measurement apparatus of claim 1, wherein said temperature measurement circuit comprises a processor and a reference junction, said reference junction comprising a temperature measurement device in thermal contact with said reference junction.

3. The tire temperature measurement apparatus of claim 2, wherein said temperature measurement device comprises a p-n junction.

4. The tire temperature measurement apparatus of claim 2, wherein said temperature measurement device comprises a thermistor.

5. The tire temperature measurement apparatus of claim 2, wherein said processor and said reference junction are located on a circuit board mounted to said patch.

6. The tire temperature measurement apparatus of claim 2, wherein said processor is located on a circuit board mounted to said patch and said reference junction is embedded in said patch.

7. The tire temperature measurement apparatus of claim 1, wherein said apparatus further comprises:
a first support element embedded in said patch, said first support element comprising a pair of first and second posts extending from said first support element;
a second support element located above a top surface of said patch, said first and second posts extending through said second support element; and
a circuit board located above said second support element, said first and second posts being operably connected to said circuit board to provide mechanical support for said circuit board;
wherein said apparatus comprises a third passage provided through said first support element and said second support element, said third passage being provided between said first post and said second post such that said first and second posts and said third passage are arranged in a substantially linear relationship.

8. The tire temperature measurement apparatus of claim 7, wherein said first and second conductive leads extend through said third passage provided through said first support element and said second support element.

9. The tire temperature measurement apparatus of claim 8, wherein said third passage provided through said first support element and said second support element is filled with a urethane or epoxy material, said urethane or epoxy material having a modulus of elasticity approximately equal to the modulus of elasticity of said first support element and said second support element.

10. The tire temperature measurement apparatus of claim 7, wherein said first and second posts and said third passage provided through said first support element and said second support element are arranged in a substantially linear relationship along a line about 80° to about 100° to a longitudinal direction of the patch, the longitudinal direction of the patch being substantially perpendicular to the direction of rotation of the tire.

11. A method for measuring temperature of a tire, comprising:
   placing a patch on a surface of the tire;
   providing a first passage in said patch and the tire;
   inserting a thermocouple comprising a measurement junction and a pair of first and second conductive leads into said first passage provided in said patch and in the tire such that said measurement junction of said thermocouple is mounted in said first passage provided in the tire and said first and second conductive leads extend through said first passage in the tire and exit the surface of the tire at an interface;
   placing said first and second wires in operable communication with a temperature measurement circuit; and
   determining said temperature of said tire at the location of said measurement junction;
   wherein said first and second conductive leads are surrounded by said patch at said interface where said first and second conductive leads exit the surface of the tire.

12. The method of claim 11, wherein said temperature measurement circuit comprises a processor and a reference junction, said reference junction comprising a temperature measurement device in thermal contact with said reference junction.

13. The method of claim 12, wherein said temperature measurement device comprises a p-n junction.

14. The method of claim 12, wherein said temperature measurement device comprises a thermistor.

15. The method of claim 12, wherein said method comprises mounting a circuit board to said patch, said processor and said reference junction being located on said circuit board.

16. The method of claim 12, wherein said method comprises mounting a circuit board to said patch, said processor being located on said circuit board and said reference junction being embedded in said patch.

17. The method of claim 11, wherein said method further comprises:
   embedding a first support element in said patch, said first support element comprising a pair of first and second posts extending from said first support element;
   positioning a second support element above a top surface of said patch such that said first and second posts extend through said second support element;
   operably connecting a circuit board to said first and second posts extending from said first support element; and
   providing a second passage through said first support element and said second support element between said first post and said second post such that said first and second posts and said second passage are arranged in a substantially linear relationship.

18. The method of claim 17, wherein said method comprises threading said first and second conductive leads through said second passage provided through said first support element and said second support element.

19. The method of claim 18, wherein said method comprises filling said second passage provided through said first support element and said second support element with a urethane or epoxy material having a modulus of elasticity substantially equal to the modulus of elasticity of said first support element and said second support element.

20. The method of claim 17, wherein said method comprises arranging said patch on said tire such that said first and second posts and said second passage provided through said first support element and said second support element are arranged in a substantially linear relationship along a line about 80° to about 100° to a longitudinal direction of the patch, the longitudinal direction of the patch being substantially perpendicular to the direction of rotation of the tire.

* * * * *